United States Patent [19]

Maekawa

[11] 4,099,077
[45] Jul. 4, 1978

[54] ROTOR FOR CORELESS MOTOR

[75] Inventor: Nobuteru Maekawa, Hikone, Japan

[73] Assignee: Matsushita Electric Works, Ltd., Japan

[21] Appl. No.: 664,759

[22] Filed: Mar. 8, 1976

[30] Foreign Application Priority Data

Mar. 15, 1975 [JP] Japan .............................. 50-35016[U]

[51] Int. Cl.² ............................................ H02K 13/04
[52] U.S. Cl. ..................................... 310/237; 310/266
[58] Field of Search ................ 310/266, 267, 237, 154

[56] References Cited

U.S. PATENT DOCUMENTS

| | | | |
|---|---|---|---|
| 2,553,292 | 5/1951 | Barrett | 310/237 X |
| 3,310,694 | 3/1967 | Hanna et al. | 310/237 X |
| 3,356,877 | 12/1967 | Burr | 310/266 |
| 3,514,654 | 5/1970 | Moreji | 310/266 |

Primary Examiner—Donovan F. Duggan
Attorney, Agent, or Firm—Leydig, Voit, Osann, Mayer & Holt, Ltd.

[57] ABSTRACT

A rotor for coreless motor comprises a cylindrical coil of a wire wound as repetitively folded back to alternately change current flowing direction with respect to magnetic field of associated stator of the motor and inner conductor of the wire is exposed at a plurality of portions equally spaced in the folded back parts forming an axial endwise edge of the cylindrical shape of the coil. The conductor exposing portions corresponds in number to stator poles and thus commutator segments, the latter of which are disposed adjacent and around an end of rotor shaft and connected respectively at a radially extended end substantially directly to the coil's conductor at each of its exposed portions.

3 Claims, 12 Drawing Figures

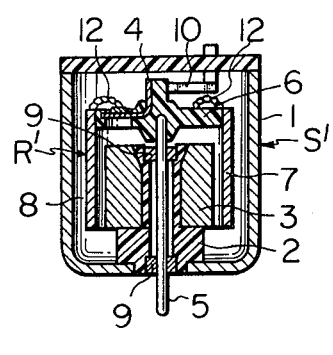
Fig. 1A
(PRIOR ART)
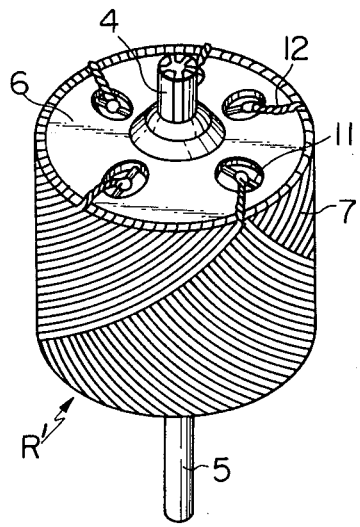
Fig. 1B
(PRIOR ART)
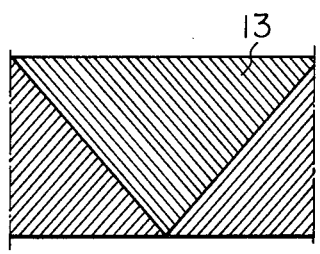
Fig. 2
Fig. 3

ROTOR FOR CORELESS MOTOR

This invention relates to coreless motors and, more particularly, to improvements in cup-shaped rotor comprising a cylindrically wound coil of the coreless motors.

Conventionally, in direct current type motors of the kind referred to in which a cylindrically wound coil is rotated around a permanent magnet, electric connection of the cylindrical coil with respective commutator segments has been made in such that, as disclosed, for example, in the U.S. Pat. No. 3,360,668, certain taps are pulled out of coil wire, on the way of winding it into a cylindrical shape by repetitively turning back the wire in diagonal upward and downward or inward and outward directions, at one of such turned back end edges of the coil's cylindrical shape and such taps are connected to the respective commutator segments. According to such conventional technique, in the process of producing a cylindrical coil, there is required a tapping step wherein the taps of the coil wire are formed by, for example, hanging several intermediate parts of the wire on tap pins while temporarily suspending the winding operation and, therefore, the operation is caused to become complicated. Further, as the operation of connecting the coil wire at its taps with the segments of the commutator is to be performed by first twisting substantially U-shaped coil wire at the respective taps together, soldering the twisted wire while removing the insulating film generally of urethane by a dipping treatment, then bending it toward the commutator and welding it with each segment of the commutator, the connecting operation is also complicated. Further, there are problems that the alignment of the respective turns of the wire as the coil will be disturbed or made irregular by the twisting at the respective taps formed as described above and, in the case where, for example, the coil should be in two layers disposed inside and outside the cylindrical shape of the coil, the wire will become three layers in the tapped part and that, in performing a finish-forming of the cylindrically wound coil into a precise cylindrical shape by heat pressing or the like, the wire will be likely to be short-circuited or even damaged at such irregular layer part in which the alignment is disturbed. In order to avoid these problems, a precise operation is required, which resulting in higher costs of the product.

The present invention has been suggested to remove the above described problems by omitting such tapping step as in the conventional art by substantially directly connecting the turned back parts of the cylindrically would coil with the segments of the commutator.

A primary object of the present invention is, therefore, to provide a coreless motor which requires no step of providing taps in the cylindrical coil and is easy to make.

Other objects and advantages of the present invention shall become clear as the following disclosures advance.

The present invention shall now be explained in detail with reference to certain preferred embodiments shown in the accompanying drawings, in which:

FIGS. 1A and 1B show an exemplary one of conventional coreless motors, which are respectively an axially sectioned view of the entire motor and a perspective view of a rotor therein shown in an enlarged scale;

FIGS. 2 and 3 show an example of a cylindrical coil winding of a rotor employed in the coreless motor according to the present invention, which are respectively a developed plan view and perspective view of the coil for schematically showing the winding manner thereof;

Figure 4:
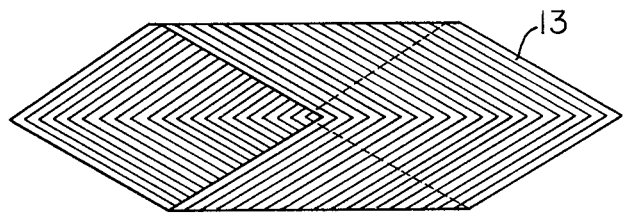
FIGS. 4 and 5 show another example of the rotor coil winding used in the coreless motor according to the present invention, which are respectively a developed plan view and perspective view of the coil for schematically showing the winding manner thereof.

Generally in conventional coreless motors, as shown in FIGS. 1A and 1B, a cylindrical permanent magnet 3 is fixed through a nonmagnetic fixture member 2 coaxially within a cup-shaped yoke 1 made of a magnetic material to form a stator S'. A commutator 4 comprising a plurality of conductive segments and a rotary shaft 5 are provided respectively on the upper surface and on the lower surface vertically centrally of a nonmagnetic and insulative plate 6 of a disk shape for holding a cylindrical coil 7 coaxially therewith. The cylindrical coil 7 is fitted to the peripheral edge of the holding plate 6 to form an inverted cup-shaped rotor R' which is rotatably supported with the rotary shaft 5 held by bearings 9 so that the cylindrical coil 7 of the rotor R' will be arranged coaxially within a circular air gap 8 defined between cylindrical inner wall of the yoke 1 and similar outer wall of the permanent magnet 3 of the stator S'. Current distributing brushes 10 fixed to a cap member are brought into contact with the segments of the commutator 4 to flow an electric current to the rotor coil. As shown in FIG. 1B, the rotor R' is provided in the upper surface part of the holding plate 6 with the commutator 4 comprising a plurality of segments vertically errected arround central axis of the disk-shaped plate 6 as mutually insulated and normally embedded in the plate 6 at their lower end terminal parts 11 extending radially from the commutator segments, and these terminal parts 11 are connected at their exposed positions with respective taps 12 of the coil 7 pulled out of a plurality of intermediate positions of the coil 7 by welding or soldering. Such taps 12 are provided at one end edge of the cylindrical shape of the coil 7, that is, at turned back positions of the coil, at intervals of a fraction of the integral number of winding turns of the coil 7, for example, $(n/5)$ where the number of magnetic poles of the stator is five and the number of turns of the coil of the rotor is $n$, and the number of the taps 12 coincides with the number of the segments of the commutator 4. The number of the magnetic poles of the stator is usually 3, 5 or 7.

Therefore, in this kind of conventional coreless motors, it is necessary to pull the taps 12 out of the coil, to scrape insulative coating of the coil off at the taps and then to connect them with the respective terminal parts 11 of the commutator segments and, as described at the preamble of the specification, these motors have been considerably troublesome and costly to manufacture.

Figure 5:
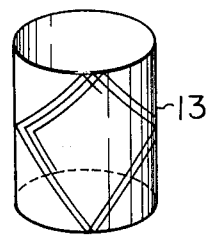

Referring now to FIGS. 2 and 3 showing an example of a rotor coil winding employed in the present invention, a material wire 13 forming the cylindrical coil is wound, as seen in FIG. 3, so as to diagonally pass through the entire wound width of the coil when it reaches the next pole from one pole of the magnetic field. In FIGS. 4 and 5 showing another example of coil winding, the wire 13 is wound in turn to form rhombuses so that the opposite angles opposed to each other on one side of the rhombus will be arranged substantially in the middle of the generatrix direction of the cylinder shape of the coil and the opposite angles on the other side will be arranged respectively on the upper and lower edges of the cylindrical coil. In either cases, the coil is wound so that the electric current flown through the coil will be in different directions with respect to the magnetic field of the stator at every turned back position of the coil.

Figure 6:
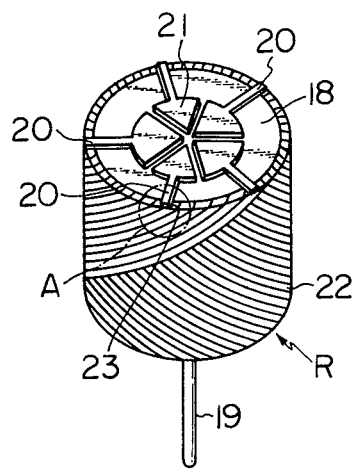
FIG. 6 is a perspective view of a rotor in one embodiment of the present invention.
Figure 7:
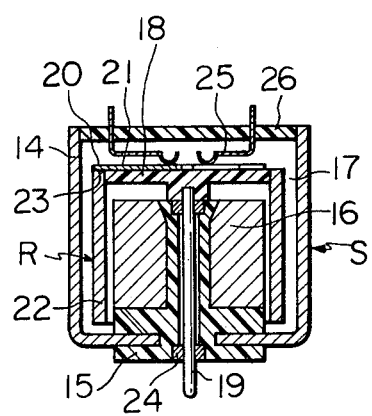
FIG. 7 is an axially sectioned view of a coreless motor of the present invention incorporating the rotor shown in FIG. 6.

Referring to an embodiment of the present invention with reference to FIGS. 6 and 7, a cylindrical permanent magnet 16 having an axial hole is coaxially fixed within a cup-shaped yoke 14 made of a magnetic material through an insulative and nonmagnetic fixture member 15 made, for example, of a synthetic resin and having an axial hole, so that a circular or cylindrical magnetic gap 17 will be formed between cylindrical inside surface of the yoke 14 and similar outer peripheral surface of the permanent magnet 16, and thus a stator S is formed.

Figure 11:
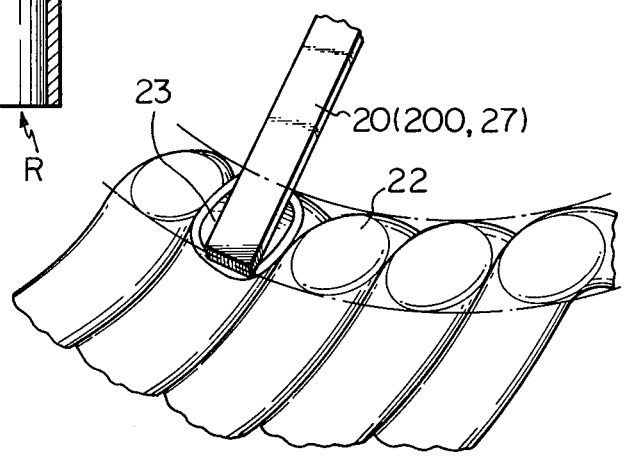
FIG. 11 is a fragmentary perspective view in an enlarged scale of a region identified by a reference "A" in FIGS. 6, 8 and 10 of the rotor according to the present invention.

A disk-shaped plate member 18 for holding the cylindrical coil rotatably in the stator S is made of a synthetic resin molding to have a rotary shaft 19 fixed at its one end vertically to the central position of the lower surface of the plate 18 and a plurality of substantially sector-shaped commutator segments 21 fixed to the upper surface of the plate 18 with a binder in the present instance so as to extend at the respective extended ends 20 out of the peripheral end of the plate 18. Since this embodiment shows the case of five stator poles, the commutator segments 21 are five, which are radially arranged at regular intervals on the upper surface of the holding plate 18. A cylindrical coil 22 wound as explained with reference to FIGS. 2 and 3 or FIGS. 4 and 5 is provided with conductor exposing parts 23 by scraping the insulating coating of the material coil wire also in five parts in the present case, similarly to the commutator segments, at regular intervals in the radial direction among all the coil's turning back parts on one axial end edge of the cylinder, which is the upper end in the drawing. It will be understood that these conductor exposing parts 23 correspond to the conventional taps as shown in FIG. 1A or 1B. The coil holding plate 18 is bonded at its periphery to the inner periphery adjacent said one axial end edge of the cylindrical coil 22 and, at the same time, the respective ends 20 of the commutator segments 21 are brought into contact and electrically connected with the respective conductor exposing parts 23 on the upper end edge of the cylindrical coil 22 and thus an inverted cup-shaped rotor R is formed. The connection of each conductor exposing part 23 on the upper end edge of the cylindrical coil 22 with the end 20 of each commutator segment 21 is as shown in FIG. 11 as magnified. It will be readily understood that each segment end is welded with only one-turn part of the coil wire by means of, for example, spot-welding preferably.

A pair of bearings 24 is provided in each end part of the axial hole of the fixture member 15 in the stator S to support the rotary shaft 19 of the rotor R so that the coil 22 of the rotor R will be arranged coaxially within the magnetic gap 17 of the stator S. Brushes 25 to distribute an electric current to the respective commutator segments 21 are provided in a disk-shaped cap 26 made of a synthetic resin. The cap 26 is secured to the open end of the cup-shaped stator yoke 14 so that the free ends of said brushes 25 extending on one surface side of the cap will contact the respective segments 21 fixed on the coil holding plate 18 of the rotor R.

Figure 8:
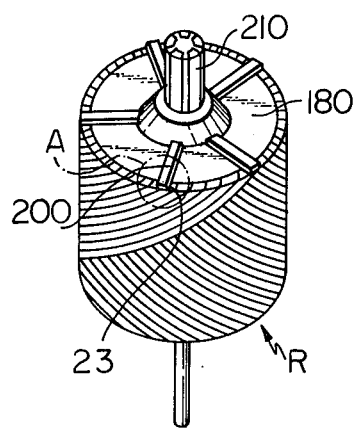
FIG. 8 is a perspective view of a rotor in another embodiment of the present invention.
Figure 9:
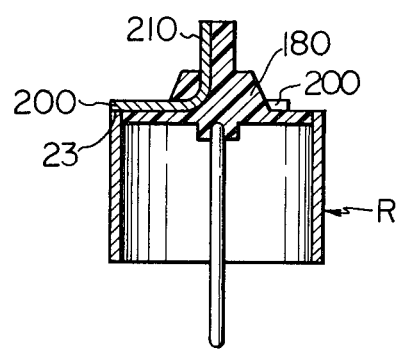
FIG. 9 is an axially sectioned view of the rotor shown in FIG. 8.

Referring next to another embodiment of the coreless motor of the present invention with reference to FIGS. 8 and 9, this embodiment is different from the foregoing embodiment shown in FIGS. 6 and 7 only in respect that commutator segments 210 are arranged as extended at one end in the direction of the rotary shaft of the rotor R. The respective segments 210 are formed to be substantially L-shaped and are embedded partially in the disk-shaped coil holding plate 180 as integrally molded therewith so that their aligned ends in the axial direction of the plate 180 are peripherally exposed along said direction so as to be utilized as brush contacting parts adapted to such type of brushes as shown in FIG. 1A, while the respective other ends 200 are extended beyond the peripheral edge of the coil holding plate 180 so as to be connected to the conductor exposing parts 23 on the upper end edge of the cylindrical coil.

Figure 10:
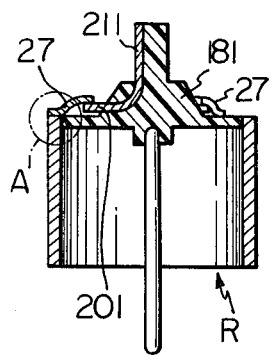
FIG. 10 is an axially sectioned view of a rotor in a further embodiment of the present invention.

Referring to still another embodiment of the coreless motor of the present invention with reference to FIG. 10, the respective commutator segments 211 which are also L-shaped are integrally molded and embedded in the coil holding plate 181 substantially in the same manner as in the case of FIGS. 8 and 9 but, whereas the axially aligned ends peripherally exposed are also adapted to be the brush contacting parts in the similar manner, the other ends 201 led out along the upper surface of the coil holding plate 181 so as to be connecting parts with the coil are, in the present instance, terminated before reaching the peripheral end of the holding plate 181 and such short connecting end parts 201 are connected with the respective conductor exposing parts 23 of the upper end edge of the cylindrical coil through separate conductive chips 27 bridging between the end parts 201 of the commutator segments 211 and the conductor exposing parts 23 of the coil.

With this arrangement of FIG. 10, it is enabled to employ the commutator segments prepared in a single size for manufacturing any cylindrical coil rotor of different diameters so that, in the case where the commutator segments are not long enough to reach the end edge of the cylindrical coil, the bridging conductor chip 27 which may be made to be of any length or a considerably long size can be effectively utilized, while in the case when the commutator segments are long enough to exceed the coil edge such excess parts of the segments may be readily cut off to achieve the arrangement of FIG. 6 or 8.

In connection with the above, it will be appreciated that, while the cylindrical coil has been referred to in the foregoing as being held by the substantially disk-shaped holding plate member 18, 180 or 181, this member may not be restricted to be of the disk shape specifically having a diameter suitable for engaging inside the cylindrical coil for achieving the peripheral coupling with the same, whereas such disk shape is preferable for ensuring that a sufficiently rigid and precise coupling between the cylindrical coil and the axial shaft of the rotor for stable coaxial positioning of the rotor within the cylindrical magnetic gap of the stator will be established. As long as such requisites are complied with, the member 18, 180 or 181 may be of any shape other than the disk shape and the same can be of even a smaller cylindrical shape which is adapted to secure the rotary shaft and brush contacting parts of the commutator segments only so that the coupling of them to the coil will be achieved by the radially extended parts of the segments for connection with the coil while, in such case, a strengthening bonding by means of, for example, a resinous adhesive agent or the like may be preferably made at the connecting regions of the segments with the coil's conductor exposing parts.

The commutator segments may also be of any other shape than those disclosed and illustrated and it will be readily appreciated that they may be, for example, a simple slab, wire or the like of straight or bent shape.

Further, in the embodiment of FIG. 10, it will be also understood that the commutator segments 211 need not be of the L-shape an end of which is connected to the coil by means of the bridging member 27 as disclosed but rather that, for example, each segment 211 may be made to comprise separate two parts of the brush contacting part and coil connecting part respectively of a simpler straight shape and, in this case, the bridging member 27 may be substituted with such separate connecting part without departing from the subject of the present invention.

Since in any event the rotor for the coreless motor according to the present invention is formed in such that the cylindrically wound coil is substantially directly connected with the commutator at the turned back position along axial endwise edge of the cylindrical coil, it is not necessary to provide any conventional taps in the coil so that the rotor can be manufactured through remarkably simpler steps and thereby a coreless motor of a lower cost can be provided.

What is claimed is:

1. In a miniature coreless motor the combination comprising a stator including a yoke member of magnetic material formed in cylindrical cup shape open at one axial end and a central magnetic member of cylindrical shape having a central bore and secured inside said yoke coaxially therewith so as to define an annular magnetic gap between the members, at least one of the members being permanently magnetized to provide poles having radial lines of flux through the gap, a rotor comprising a radially thin cylindrical coil formed of progressive uniform and smoothly continuous convolutions of insulated wire, the coil being disposed coaxially in the annular gap and presenting a narrow circular axially-facing end edge, the convolutions being sharply bent over at the end edge to form a continuous circular row of closely adjacent turning points, a disc of insulating material secured within the axially-facing end edge, a rotor shaft axially mounted in the disc for supporting the same, said shaft being extended through, and journaled in, the central bore for free rotation therein, a plurality of radially-extending conductive commutator segments supported on the insulating disc and having equal angular spacing, a pair of brushes secured to the yoke for wiping engagement by the commutator segments to form an armature circuit, each commutator segment terminating at its outer end in a narrow radial conductor which overlies the axially-facing end edge of the coil, the insulation being removed at respective ones of the convolution turning points to expose the turning points at locations aligned with the narrow radial conductors, the narrow radial conductors having a metal-to-metal bond with the respective exposed turning points.

2. The combination as claimed in claim 1 in which the commutator segments are uniformly sector shaped at their inner ends and mounted in coplanar relation on the face of the insulating disc.

3. The combination as claimed in claim 1 in which the commutator segments are each of uniform "L" shape with one leg of each of them radially supported on the insulating disc in a common plane and with their other legs extending away from the plane of the disc and symmetrically spaced about the central axis for wiping engagement with the brushes.

* * * * *